Dec. 21, 1954     M. P. WINTHER     2,697,367
TRANSMISSION
Filed Nov. 13, 1950     4 Sheets-Sheet 2
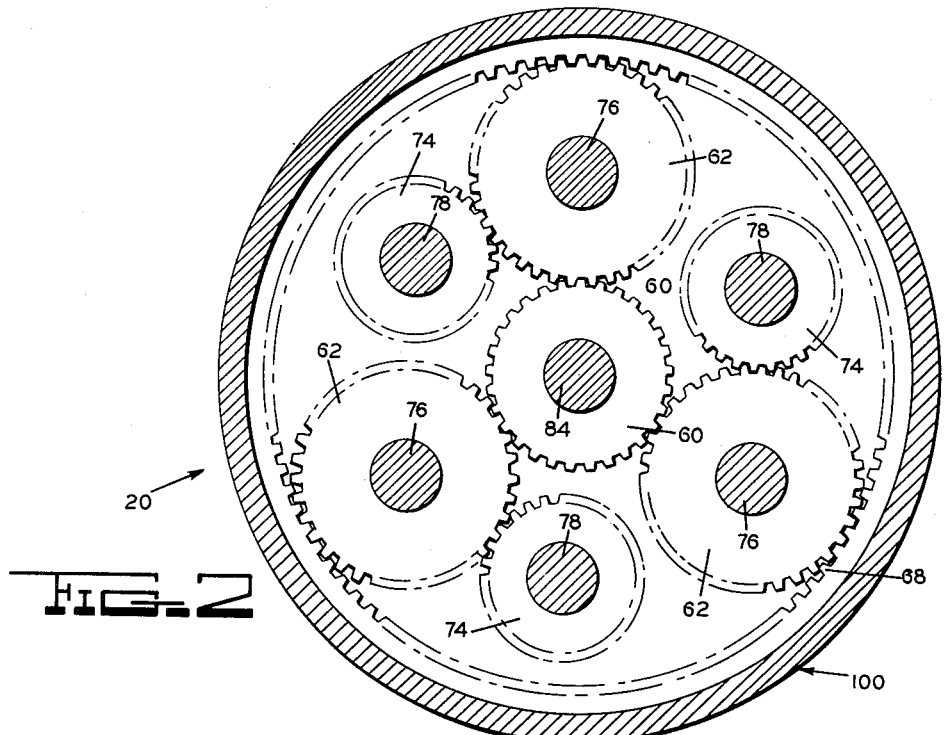
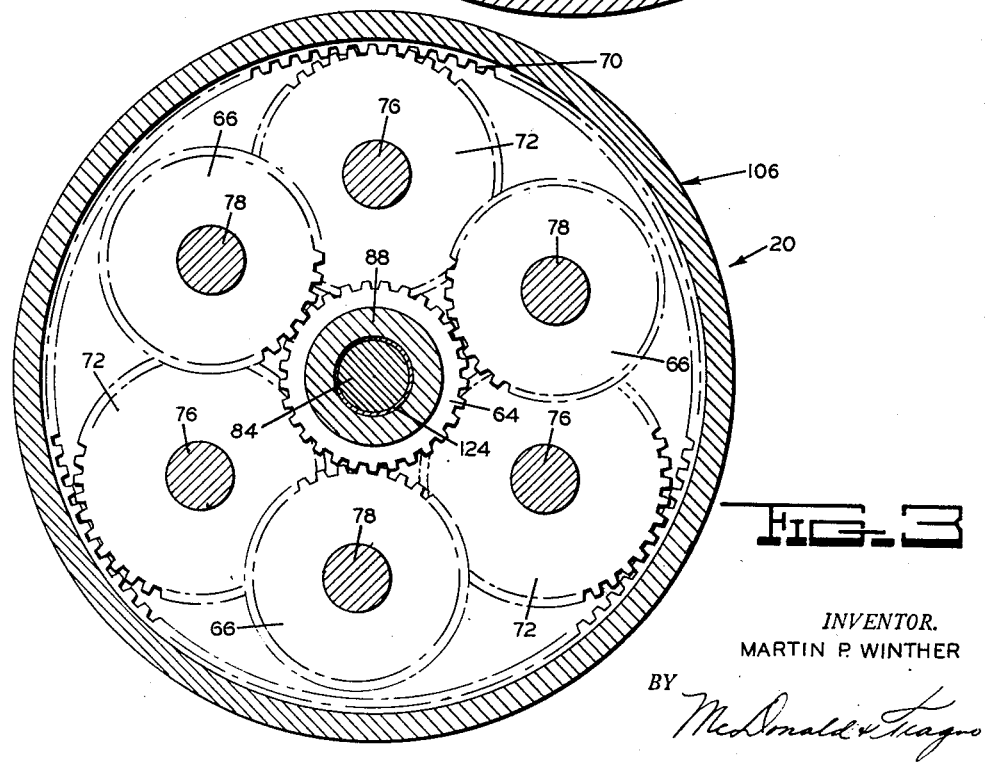
INVENTOR.
MARTIN P. WINTHER
BY
ATTORNEYS Dec. 21, 1954  M. P. WINTHER  2,697,367
TRANSMISSION
Filed Nov. 13, 1950  4 Sheets-Sheet 3
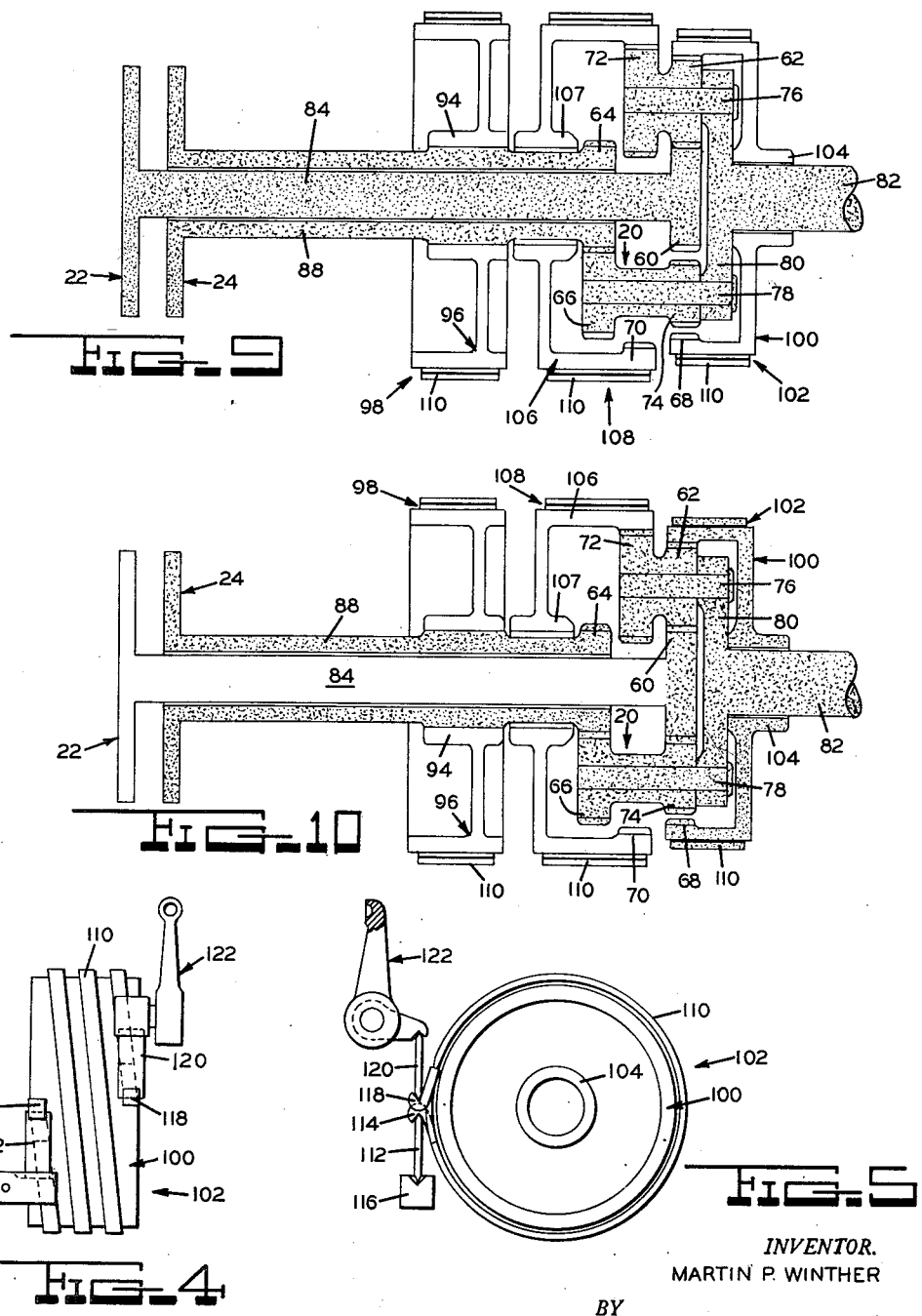
INVENTOR.
MARTIN P. WINTHER
BY
McDonald & Fragro
ATTORNEYS

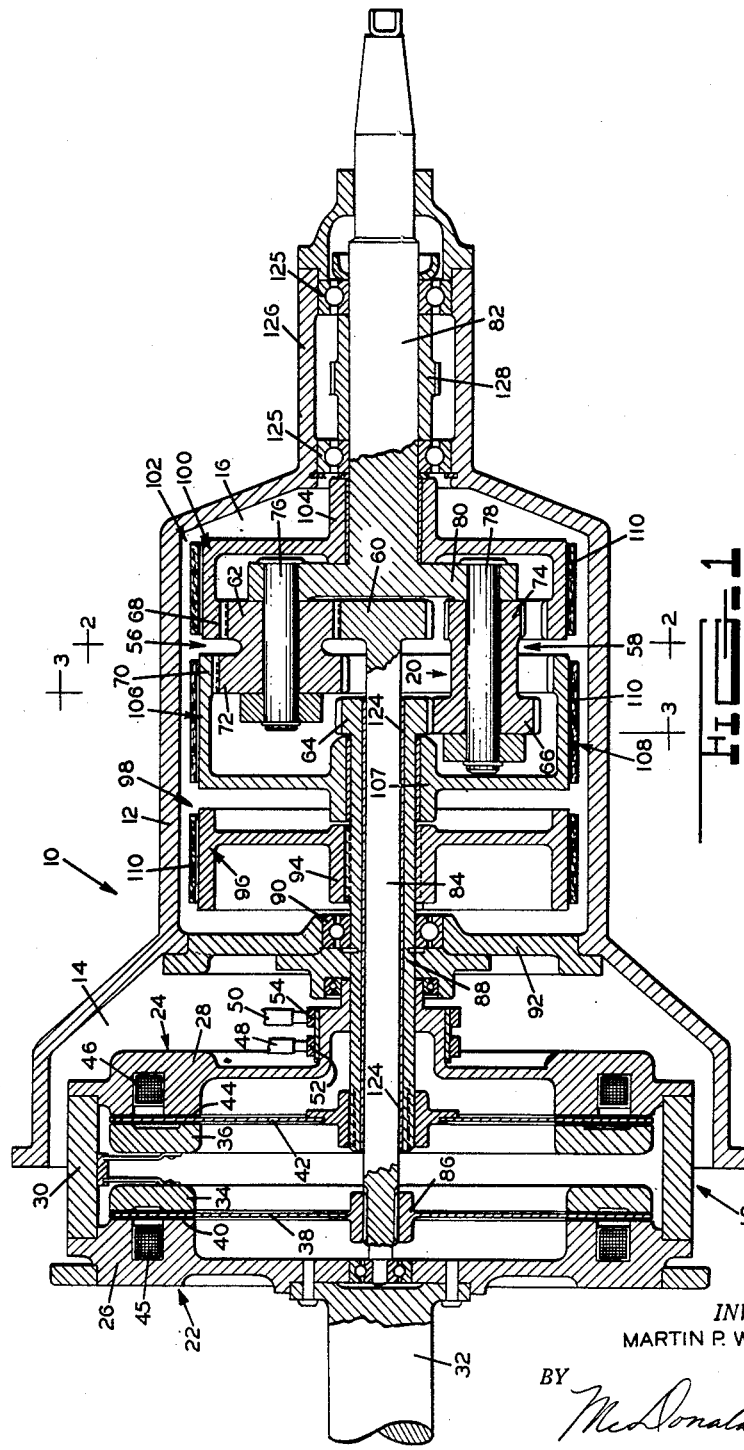

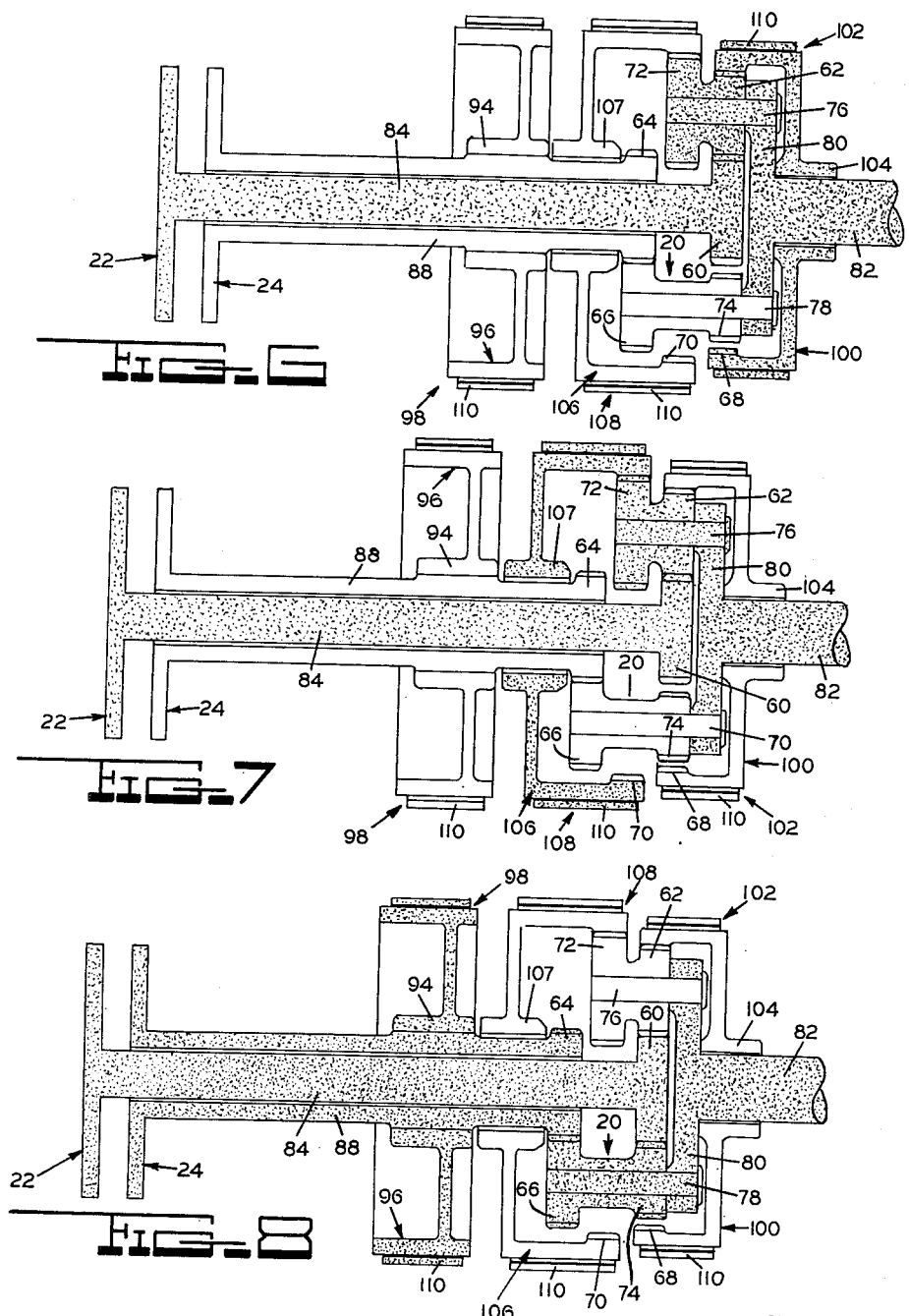

United States Patent Office 2,697,367
Patented Dec. 21, 1954

2,697,367

TRANSMISSION

Martin P. Winther, Gates Mills, Ohio, assignor, by mesne assignments, to Eaton Manufacturing Company, Cleveland, Ohio, a corporation of Ohio Application November 13, 1950, Serial No. 195,379

17 Claims. (Cl. 74—761)

This invention relates to change speed gear mechanisms and more particularly to multiple gear ratio transmissions for automotive vehicles and the like.

Broadly the invention comprehends the provision of a four speed forward and one speed reverse change speed transmission primarily for automotive vehicles and wherein the transmission basically embodies a pair of power input interconnection clutches, a compound planetary gear system and three brake mechanisms operatively engageable with elements of the planetary gear system for effecting the desired gear ratio output of the transmission.

Although a multiplicity of change speed gear transmissions have been devised in connection with the rapid growth of the automotive industry the instant invention is the first to utilize a compound planetary gear system in association with a pair of engine drive connection clutches such that through the interrelated control of various elements of the gear system, four forward speeds and one reverse speed is effectively obtainable.

Among the several objects of the invention is the provision of a change speed gear transmission that is simple, compact and economical in construction, easily controlled and effective in operation; that affords four forward speeds and one reverse speed without necessity of any shifting of gears thereby affording a transmission of quick operation; that can be controlled by any of several mediums such as air pressure, hydraulic pressure, vacuum, or electrically and either manually or automatically, depending on the desires of the user; and that embodies solely a singular compound planetary constant mesh gear system which through the proper control thereof provides for five different gear ratio output conditions for the transmission.

Other objects and advantages of the invention will appear from the following description taken in connection with the drawings forming a part of the specification and in which:

Fig. 1 is a vertical cross-sectional view of a transmission embodying the invention;

Fig. 2 is an enlarged cross-sectional view taken substantially along lines 2—2 of Fig. 1;

Fig. 3 is an enlarged cross-sectional view taken substantially along lines 3—3 of Fig. 1;

Fig. 4 is an end view of the general type of braking mechanism employed in the planetary gear system of the transmission of Fig. 1;

Fig. 5 is an elevation view of Fig. 4, and

Figs. 6 through 10 are schematic illustrations of the transmission in the varying gear ratio conditions of operation thereof.

Similar reference characters indicate corresponding parts through the several views of the drawings.

The present change speed gear transmission was devised for the purpose of providing a transmission of simple, compact and economical construction which is capable of fulfilling all the operating requirements of present day automotive vehicles in providing four forward speed gear ratios and one reverse speed gear ratio. Through the utilization of a compound planetary gearing system interconnectedly interposed intermediate the power output shaft and a pair of clutches having controlled driving relation with the power input shaft of the transmission and with the proper controlled braking of certain of the sun and ring gears of the planetary gear system the desired forward and reverse speed gear conditions are easily and effectively attained. Although the clutches are preferably of the type more fully disclosed by co-pending application S. N. 91,792, filed May 6, 1949, now Patent No. 2,580,869, they may be of any of several common types employed intermediate driving and driven mechanisms. The braking mechanisms for the transmission can be actuated by any one of a number of means such as air pressure, hydraulic pressure, vacuum or electrically and manually or automatically, depending on the desired operational use thereof.

Referring to the drawings for more specific details of the invention 10 represents generally a change speed gear transmission comprising a housing 12 having respective clutch and gear compartments 14 and 16 within which clutch mechanism 18 and planetary gear system 20 are respectively arranged.

The clutch mechanism 18 includes two clutches 22 and 24 said clutches as disclosed by Fig. 1 being preferably of the type more fully disclosed by co-pending application S. N. 91,792. The respective input or pole members 26 and 28 of clutches 22 and 24 are fastened together by an annular member 30 bolted or otherwise secured therebetween and pole member 26 is in turn suitably secured at its hub to an engine power output or crankshaft 32 by way of which power is delivered to the transmission.

Respective armature or pressure plates 34 and 36 of the clutches 22 and 24 are resiliently mounted upon the member 30 and are adapted to be moveable axially toward and away from the pole faces of their respective pole members.

A clutch plate 38 forming the output or driven member of clutch 22 has an annular portion thereof interposed between the pole member 26 and armature 34 of clutch 22. Suitable friction linings 40 of the type disclosed by co-pending application S. N. 91,792 is secured upon opposite faces of the clutch plate 38 over an annular surface thereof for frictional engagement with the respective pole faces of the pole member 26 and armature 34 when the armature is moved axially toward the pole member.

Similarly to clutch 22, clutch 24 is provided with a clutch plate 42 having friction linings 44 secured on opposite annular portions thereof for engagement with the pole faces of the respective pole member 28 and armature 36.

Electromagnetic coils 44 and 46 are mounted respectively in the pole members 26 and 28 and are supplied current from a suitable source not shown by the respective current conducting brushes 48 and 50 having current contacting relation with respective terminal rings 52 and 54 connected at the ends of the current leads of the respective coils 44 and 46.

The planetary gear system is compound in nature in that it includes a plurality of planet cluster gear sets 56 and a plurality of planet cluster gear sets 58, a sun gear 60 meshing with pinion gears 62 of gear sets 56, a sun gear 64 meshing with pinion gears 66 of gear sets 58, a ring gear 68 meshing with pinion gears 62 of gear sets 56 and a ring gear 70 meshing with pinion gears 72 of gear sets 56. Pinion gears 62 in addition to meshing with sun gear 60 and ring gear 68 mesh with pinion gears 74 of gear sets 58.

The gear sets 56 and 58 are arranged in alternate circumferential relation and are supported for rotation upon respective planet carrier shafts 76 and 78, with the shafts 76 and 78 fixedly secured upon a planet carrier 80 forming a part of transmission output shaft 82.

A shaft 84 journalled at one end in the hub of pole member 26 has sun gear 60 formed integrally therewith at its opposite end and has the hub 86 of clutch plate 38 splined for axial movement thereon intermediate its ends.

A quill shaft 88 journalled in bearings 90 supported on a wall member 92 of housing 12 separating the clutch and gear compartments has sun gear 64 formed integrally therewith at one end, clutch plate 42 splined for axial movement thereon at its other end and has the hub 94 of a brake drum 96 of brake 98 fixedly splined thereto intermediate its ends.

The ring gear 68 is formed integrally with a brake drum 100 of brake 102, the hub 104 of which is freely journalled upon output shaft 82 and ring gear 70 is formed integrally with a brake drum 106, of brake 108, the hub 107 of which is journalled on the quill shaft 88.

Each of the brakes 98, 102 and 108 is provided with a brake band 110 of the wrap around type shown by Fig. 4 and 5 wherein a two direction braking action is possible, that is a holding torque action in one direction of rotation of the brake drum relative to the brake band and a coasting torque action in its opposite direction of rotation. This is possible through the positioning of a free link 112 between the one free end 114 of brake band 110 and a fixed anchor 116 therefor whereas the actuated end 118 of the brake band is actuated by way of a free link 120 interposed between the end 118 and a manual or otherwise suitably actuated lever mechanism 122. The operational effect of this form of brake band will be set forth hereinafter in relation to the overall operation of the transmission.

The shaft 84 in addition to being journalled in the hub of pole member 26 is supported for rotation in suitable sleeve bearings 124 mounted internally of quill shaft 88. Output shaft 82 is supported for rotation upon a pair of axially spaced bearings 125 mounted in a reduced portion 126 of transmission housing 12 and has splined therein intermediate the bearings a gear 128 adapted to mesh with suitable gearing of a governor, not shown, which may be used in the proper regulation of mechanism when the automatic operation of the transmission is desired.

In a normal operation of the transmission as employed in an engine driven vehicle with the engine idling and the vehicle stationary both clutches 22 and 24 are disengaged, that is the coils of both clutches are deenergized such that the rotation imparted to the interconnected driven or pole members 26 and 28 of the respective clutches by the output shaft 82 of the engine is not transmitted to the clutch plate or output members of the cluches.

When it is desired to start the forward motion of the vehicle the coil 44 of the clutch 22 is energized thus effecting an engagement of the clutch and the resultant transmission of motion of clutch plate 38 thereof. Simultaneously with the engagement of clutch 22, the brake band 110 of brake 102 is actuated to inhibit rotation of brake drum 100 which in turn operates to resist rotation of ring gear 68. Through the operational engagement of clutch 22 and the consequent rotation of clutch plate 38 thereof said rotation of the clutch plate is transmitted by way of shaft 84, to which it is splined, to sun gear 60 whereby in view of the braked relation of ring gear and the intermeshing of ring gear 68 and sun gear 60 with the planet gears 62, the planet gears are made to roll around the inside of stationary ring gear 68 and cause shafts 76, planet carrier 80 and the output shaft 82 to rotate in a forward direction at a predetermined speed slower than shaft 84. This is referred to as the low or 1st speed of operation of the transmission.

After the attainment of the low speed of operation and the desire to change to a higher speed of the output shaft the brake band 110 of brake 102 is released and concomitantly therewith the brake band 110 of brake 108 is actuated under which condition brake drum 106 and ring gear 70 formed integrally are held stationary. With the release of ring gear 68 in view of the release of brake band 110 of brake 102 the ring gear 68 together with drum 100 is free to rotate. By holding ring gear 70 stationary, the pinion gear 72 of gear set 56, wherein pinion gear 62 is rotated by the transmission of motion thereto from sun gear 60, rolls around inside of stationary ring gear 70 thus causing rotation of shafts 76, planet carrier 80 and output shaft 82 at a higher speed than when pinion gear 62 was rolling inside of stationary ring gear 68. This higher or second speed operation of the transmission is attained primarily because of the relative sizes of the pinion gears 62 and 72 to one another, as otherwise the planet gear set 56 is the same one being rotated in each instance for both first and second speeds.

Third speed of operation of the transmission is achieved when brake band 110 of brake 108 is released from holding brake drum 106 and ring gear 70 stationary and simultaneously therewith brake band 110 of brake 98 is actuated to inhibit rotation of drum 96, quill shaft 88 splined thereto and sun gear 64 formed integral with the shaft. With the holding of sun gear 64 stationary the rotation of sun gear 60 from clutch 22, which remains the same as for the first and second speeds of operation of the transmission, operates to rotate the planet gear sets 56 and which through the intermeshing relation of pinion gears 74 thereof and pinion gears 62 of planet gear set 56 the planet gear set 58 is rotated. While because of the release of both brake bands 110 of brakes 102 and 108 the planet gear set 56 does not operate to transmit any motion to planet carrier 80 and output shaft 82 as was done in the first and second speeds of the transmission, the rolling reaction of planet pinion gears 66 of planet gear sets 58 upon stationary sun gear 64 will provide for the rotation of shafts 78, planet carrier 80 and output shaft 82 at a speed representing the third speed of operation of the transmission.

The fourth forward speed of operation of the transmission is had upon release of brake band 110 of brake 98 and energization of coil 46 resulting in an engagement of clutch 24 such that together with the continued engagement of clutch 22, which has been maintained engaged throughout the first three forward speeds of the transmission and with the brake bands 110 of brakes 102 and 108 maintained released, the gearing of the planetary gear system becomes immobilized resulting in the rotation thereof as a unit with carrier 80 and shafts 84, 88 and 82 thereby providing a one to one direct drive or top speed of output shaft 82.

A reverse operation of the transmission is secured through solely the energization of coil 46 of clutch 24 for the engagement thereof and the actuation of brake band 110 of brake 102 while clutch 22 is disengaged and brake bands 110 of brakes 98 and 108 are released such that the rotation transmitted to shaft 88 and sun gear 64 causes a rotation of planet pinion gear sets 58 by way of pinion gears 66 meshing with sun gear 64. With the rotation of planet pinion gear sets 58 and the stationary condition of ring gear 68 as held by brake band 110 of brake 102, pinion gears 62 of gear sets 56, by way of planet pinion gears 74 of planet gear sets 58 meshing therewith are made to roll reversely inside of ring gear 68 thus transmitting through the medium of shafts 76, and carrier 80 a reverse rotation to output shaft 82.

Because of the holding and coasting torque characteristics of the brake bands in relation to the drum of the brakes 98, 102 and 108 depending on the direction of rotation of the drums, a smooth shift over from one gear ratio of operation to another is achieved. For example, with the transmission in operation in first speed wherein the brake band 110 of brake 102 is closed to inhibit rotation of drum 100 and ring gear 68, an application of brake band 110 of brake 108 to effect a braking of drum 106 and ring gear 70 for effecting second speed operation of the transmission would normally brake the output shaft 82 but for the fact that the ring gear 68 would be immediately relieved of its forward driving requirements and start turning in the coasting torque holding direction in brake band 110 of brake 102. This reduced value of braking torque will then be immediately released as the brake band 110 of brake 102 is released simultaneously with the actuation of brake band 110 of brake 108. The braking action of brake band 110 of brake 108 when fully energized will effect a full or holding torque operation upon the drum whereas the brake band 110 of brake 102 just prior to full release thereof as brake band 110 of brake 108 is applied will only have coasting torque effect. The same characteristics of operation will prevail for the condition of advancing from second to third speed wherein the brake band 110 of brake 98 is applied and simultaneously therewith the brake band 110 of brake 108 is released.

Figs. 6 through 10 illustrate schematically in consecutive order the clutch or clutches and the various intermeshing gears employed as controlled by one of the brake bands in the operation of the transmission in first, second, third and fourth forward gear and in reverse gear.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. A power transmission comprising first and second selectively operable clutches, a shaft connected to the first clutch, a shaft connected to the second clutch, a power output shaft, a compound planetary gear system interconnected between the shafts connected to the clutches and the output shaft, including two sets of intermeshing planet pinion cluster gear sets supported for rotation on the output shaft, two sun gears, one connected with one of the first two shafts and the other connected with the other of the two first shafts and with one meshing with one group of pinion gears and the other meshing with the other group of pinion gears of the respective cluster gear sets and two ring gears, one meshing with one group of pinion gears of one of the cluster gear sets and the other meshing with another group of pinion gears of the same cluster gear set, said last group of pinion gears being in mesh with one of the sun gears, and means for controlling the operation of the planetary gear system, said system including pinion gears of the cluster gear sets meshing with one another and rotatably supported on the output shaft.

2. A transmission according to claim 1 wherein the means for controlling the operation of the planetary gear system comprises means for retarding rotation of one of the sun gears, means for retarding rotation of one of the ring gears and means for retarding rotation of the other ring gear.

3. A transmission according to claim 2 wherein the ring gears are free to rotate at will when no retardation action is applied thereto.

4. A transmission according to claim 3 wherein the means for retarding rotation of the sun gear is in the form of a braking mechanism applied to the shaft to which the sun gear is connected.

5. A transmission according to claim 2 wherein the means for retarding rotation of the ring gears comprises brake drums formed integrally with the ring gears and brake bands engageable upon the brake drums.

6. A transmission according to claim 5 wherein the shaft of the second clutch is a quill shaft concentric with the shaft of the first clutch.

7. A transmission according to claim 6 wherein the output shaft includes a planet carrier formed integrally therewith upon which the planet pinion cluster gear sets are rotatably mounted.

8. A transmission according to claim 2 wherein the clutches each include driving and driven members.

9. A transmission according to claim 8 wherein the driving members of the clutches are fixedly connected to a common power input shaft therefor and the driven members are connected respectively to the sun gears.

10. A transmission according to claim 1 wherein each of the cluster gear sets includes two groups of pinion gears of different size from one another.

11. A transmission according to claim 10 wherein the group of pinion gears on one of the cluster gear sets are both of smaller diameter than the group of pinion gears on the other cluster gear sets.

12. A transmission according to claim 11 wherein one of the ring gears is in meshing engagement with the smaller group of pinion gears on one of the cluster gear sets and the other ring gear is in meshing engagement with the larger group of pinion gears of the same cluster gear sets.

13. A transmission according to claim 12 wherein the one sun gear is in meshing engagement with the smaller group of pinion gears on the cluster gear sets which are in meshing engagement with one of the ring gears and the other sun gear is in meshing engagement with the larger group of pinion gears on the other cluster gear sets.

14. A transmission according to claim 13 wherein means are provided for breaking the rotation of the sun gear meshing with the larger group of gears on the one set of cluster gear sets.

15. A transmission according to claim 14 wherein means are provided for independently braking the ring gears.

16. A power transmission comprising first and second like selectively operable clutches, a common input means for the clutches, a shaft connected to the first clutch, a shaft connected to the second clutch, a power output shaft, a compound planetary gear system interconnected between the shafts connected to the clutches and the output shaft, including two sets of intermeshing planet pinion gears supported for rotation on the output shaft, two sun gears, one fixedly connected with one of the first two shafts and one fixedly connected with the other of the first two shafts and with one sun gear meshing with one of the planet pinion gear sets and the other sun gear meshing with the other planet gear set, two ring gears meshing with one of the planet pinion gear sets and means for controlling the operation of the planetary gear system.

17. A transmission according to claim 16 wherein the means for controlling the planetary gear system includes means for inhibiting rotation of one of the sun gears and other means for inhibiting the rotation of the ring gears.

References Cited in the file of this patent

UNITED STATES PATENTS

| Number | Name | Date |
|---|---|---|
| 1,256,372 | Rowledge | Feb. 12, 1918 |
| 1,629,021 | Culver | May 17, 1927 |
| 2,220,174 | Ravigneaux | Nov. 5, 1940 |
| 2,239,973 | Ravigneaux | Apr. 29, 1941 |
| 2,372,817 | Dodge | Apr. 3, 1945 |
| 2,606,459 | Carnegie | Aug. 12, 1952 |

FOREIGN PATENTS

| Number | Country | Date |
|---|---|---|
| 20,861 | Great Britain | Aug. 28, 1904 |
| 150,336 | Germany | Apr. 13, 1904 |